(12) United States Patent
Oishi et al.

(10) Patent No.: US 7,111,121 B2
(45) Date of Patent: Sep. 19, 2006

(54) USB STORAGE DEVICE AND PROGRAM

(75) Inventors: Yuji Oishi, Nagoya (JP); Kimitoshi Nakamura, Nagoya (JP); Megumi Tokunaga, Nagoya (JP); Kaoru Miyazaki, Nagoya (JP); Kaihei Ito, Nagoya (JP); Naoki Fujita, Nagoya (JP)

(73) Assignee: Hagiwara Sys-Com Co., Ltd., Nagoya (JP)

( * ) Notice: Subject to any disclaimer, the term of this patent is extended or adjusted under 35 U.S.C. 154(b) by 13 days.

(21) Appl. No.: 10/446,538

(22) Filed: May 28, 2003

(65) Prior Publication Data

US 2003/0225971 A1 Dec. 4, 2003

(30) Foreign Application Priority Data

May 29, 2002 (JP) .............................. 2002-155684
Apr. 30, 2003 (JP) .............................. 2003-125464

(51) Int. Cl.
  G06F 12/00 (2006.01)
(52) U.S. Cl. ...................................... 711/115; 711/173
(58) Field of Classification Search ................. 711/115
  See application file for complete search history.

(56) References Cited

U.S. PATENT DOCUMENTS

| | | | |
|---|---|---|---|
| 5,454,096 A | 9/1995 | Otsuka et al. | 395/401 |
| 5,604,917 A | 2/1997 | Saito et al. | 395/869 |
| 5,634,111 A * | 5/1997 | Oeda et al. | 711/153 |
| 6,282,710 B1 * | 8/2001 | Boehler | 717/174 |
| 6,292,874 B1 | 9/2001 | Barnett | 711/153 |
| 6,601,139 B1 | 7/2003 | Suzuki | 711/115 |
| 6,606,707 B1 * | 8/2003 | Hirota et al. | 713/172 |
| 6,609,173 B1 * | 8/2003 | Watkins | 711/103 |
| 6,691,234 B1 | 2/2004 | Huff | 713/300 |
| 6,715,043 B1 * | 3/2004 | Stevens | 711/154 |
| 6,757,783 B1 * | 6/2004 | Koh | 711/115 |
| 2002/0040418 A1 | 4/2002 | Bress et al. | |
| 2002/0073340 A1 | 6/2002 | Mambakkam et al. | |
| 2002/0162009 A1 * | 10/2002 | Shmueli et al. | 713/200 |
| 2002/0188812 A1 | 12/2002 | Sadhasivan et al. | 711/153 |
| 2003/0217247 A1 | 11/2003 | Abramovitz et al. | 711/173 |

FOREIGN PATENT DOCUMENTS

JP 07-234759 9/1995

(Continued)

OTHER PUBLICATIONS

Microsoft Computer Dictionary, Fourth Edition, Microsoft Press, 1999, p. 37.*

(Continued)

Primary Examiner—Pierre Vital
(74) Attorney, Agent, or Firm—Davis & Bujold, P.L.L.C.

(57) ABSTRACT

A USB storage device having the function of preventing stored software from being deleted by mistake achieved with as simple a structure as possible. In the USB storage device, the storage area is divided into an area in which execution of reading, writing and deleting is allowed and an area in which only execution of reading is allowed. Information to make a USB mass storage class driver recognize these areas as areas corresponding, respectively, to logical unit numbers defined in the SCSI command set of the USB mass storage class driver owned by the host is stored in the USB storage device. The information includes logical unit numbers, formats, writing/deleting allowed/not allowed flag, logical block numbers and physical block numbers. By this, the USB mass storage class driver recognizes the USB storage device as a SCSI device having two logical units.

6 Claims, 8 Drawing Sheets

FOREIGN PATENT DOCUMENTS

| | | |
|---|---|---|
| JP | 10-289159 | 10/1998 |
| JP | 200-259275 | 9/2000 |
| JP | 2002-222158 | 8/2002 |
| WO | WO-99/42915 | 8/1999 |
| WO | WO-02/27445 A2 | 4/2002 |
| WO | WO-03/003242 A1 | 1/2003 |

OTHER PUBLICATIONS

"Universal Serial Bus Mass Storage Class Specification Overview," Revision 1.1, Jun. 28, 2000.*

"Universal Serial Bus Mass Storage Class Bulk-Only Transport," Revision 1.0, Sep. 31, 1999.*

"Universal Serial Bus Storage Class UFI Command Specification," Revision 1.0, Dec. 14, 1998.*

Apple Computer Inc., "Writing Drivers for Mass Storage Devices," May 27, 2002.* http://developer.apple.com/hardware/usb/usb_mail/2001/usbmail0715.htm, bulletin board messages dated Wed, Jul. 18, 2001 20:16:07 +0800.* http://developer.apple.com/hardware/usb/usb_mail/2001/usbmail0101.htm, bulletin board messages dated Thu, Jan. 4, 2001 09:17:25 –0800.*

PowerQuest Corporation, "PartitionMagic 7.0 User Guide," Aug. 2001, pp. 1-60.*

"Information Technology—Small Computer System Interface—2", Working Draft, Revision 10L, Sep. 7, 1993, pp. 72-75, pp. 5.

"Universal Serial Bus Mass Storage Class—Bulk-Only Transport", Revision 1.0, Sep. 8, 1999, pp. 7 and 8, pp. 3.

"Universal Serial Bus Mass Storage Class—Specification Overview", Revision 1.0d, Dec. 13, 1999, pp. 2-7, pp. 7.

"Information Technology—AT Attachment With Packet Interface—6", Working Draft, Revision 3b, Feb. 26, 2002, pp. 135-148, pp. 15.

"Information Technology—Multimedia Commands—4 (MMC-4)", Working Draft, Revision 2, Apr. 28, 2003, pp. 254-256 and 346-360, pp. 19.

* cited by examiner

FIG. 2

| LOGICAL UNIT NUMBER (31) | FORMAT (33) | WRITING/DELETING ALLOWED/NOT ALLOWED FLAG (35) | LOGICAL BLOCK NUMBER (37) | PHYSICAL BLOCK NUMBER (39) |
|---|---|---|---|---|
| 0 | FAT | ALLOWED | 001 | 101 |
|   |   |   | 002 | 102 |
|   |   |   | 003 | 103 |
|   |   |   | 004 | 104 |
|   |   |   | . | . |
|   |   |   | . | . |
| 1 | ISO9660 | NOT ALLOWED | 001 | 201 |
|   |   |   | 002 | 202 |
|   |   |   | 003 | 203 |
|   |   |   | 004 | 204 |
|   |   |   | . | . |
|   |   |   | . | . |

USB STORAGE DEVICE AND PROGRAM

BACKGROUND OF THE INVENTION (i) Field of the Invention

The present invention relates to a USB storage device for storing information using a semiconductor memory.

(ii) Background Art

These days, attachable and detachable USB storage devices, each of which comprises an installed flash memory and an interface according to the USB (Universal Serial Bus) standard and has a compact configuration by integrating its USB connector portion into the main body, are widely known as described in Publication of Unexamined Japanese Patent Application No. 2000-259275. Such USB storage devices with a compact configuration can be manufactured at a low cost, and are utilized for companies' sales promotion items into which software of commercials and others is written.

Most of these USB storage devices are provided with a physical switch, such as a write protect switch, to prevent the software from being deleted by mistake. By changing the switch, switching between the state in which reading, writing and deleting is possible and the state in which only reading is possible is available. In some cases an inherently unwritable memory, such as a ROM, is used to completely prevent writing and deleting However, when a ROM or the like is used in a USB storage device to prevent a user from writing information, the USB storage device has only limited applications and thus reduced usability. In other cases, it is impossible to write temporary files or data during execution of the software, which limits the function of the software itself. When a write protect switch as mentioned above is used, the write protect switch is sometimes turned off due to some physical factor unknown to the user, and thereby unintended writing or deleting may be performed.

To solve these problems, technology as described in Publication of Unexamined Japanese Patent Application No. 10-289159 has been devised. According to the technology, a portable-type writable medium has a hybrid configuration by virtually providing an unwritable area and an unreadable area.

When applying the above described technology to a USB storage device, practical working methods may be as the following.

In one working method, a USB storage device is provided with two internal USB storage device units (deleting and writing is restricted in one of the USB storage device units) and a hub connecting these USB storage device units. However, there is a problem that such a USB storage device has a complex configuration as it actually has two USB storage device units therein. There is another problem that when the USB storage device is connected to a host, connecting processing takes time since the host first recognizes the USB storage device as a HUB device and then initializes the same number of mass storage class drivers as the number of internally provided USB storage device units.

In another working method, the number of endpoints in the USB standard is increased. In this case, however, a controller provided in the USB storage device is required to have the same number of FIFO buffers as the number of the endpoints. Although there is a newer controller without multiple FIFO buffers by the technology of using virtual endpoints, all these controllers have complex configurations, and thus lead to an increased manufacturing cost.

An object of the present invention, which has been made to solve the above problems, is to provide a USB storage device which has as simple a structure as possible and achieves the function of preventing stored software from being deleted by mistake.

SUMMARY OF THE INVENTION

The above and other objects are attained by a USB storage device which is capable of being attached to and detached from an external device and comprises: storage means for storing information using a semiconductor memory, communication means for performing communication according to the USB protocol with the external device, and control means for executing reading, writing and deleting of the information to and from the storage means in accordance with a command received from the external device through the communication means. The control means divides the storage means into a first area and a second area, and executes reading, writing and deleting of the information to and from the first area in accordance with the command and executes only reading of the information from the second area in accordance with the command The control means retains information to make the USB mass storage class driver recognize the first and second areas as areas corresponding to logical unit numbers defined in the SCSI command set of the USB mass storage class driver owned by the external device. The control means makes the USB mass storage class driver recognize the USB storage device as a SCSI device having two logical units Therefore, when the USB storage device according to the present invention is used as a sales promotion item and the software which should not be deleted by mistake is stored in the second area, deletion or alteration of the software can be prevented since even if a command to delete is received from the external device (e.g. a personal computer), the command will not be executed by the control means.

On the other hand, the first area is usable since a user can freely write information to the area without turning on and off a protect switch or the like.

The first area may be, for example, in FAT (File Allocation Table) format and the second area may be, for example, in ISO9660 format. This enables the operation system of the external device to recognize the respective formats and limit issuance of a command to write or a command to delete to and from the second area, while allowing issuance of a command to read, write and delete to and from the first area. Furthermore, even if a command to write or delete to and from the second area is issued by the external device for some reason, the control means of the USB storage device of the present invention will not execute the command, and thus the software stored in the second area will be surely protected.

The USB storage device according to the present invention has the information to make a USB mass storage class driver recognize the first area and the second area as areas corresponding to the logical unit numbers defined in the SCSI command set of the USB mass storage class driver. Accordingly, the USB mass storage class driver recognizes the present USB storage device as a SCSI device having two logical units.

In this case, the controller of the USB storage device can be simplified compared with the case where area management is performed by increasing the number of endpoints according to the USB standard and the controller is required to have the same number of FIFO buffers as the number of the endpoints.

Also compared with the case where area management is performed by providing two kinds of USB storage device units and a hub connecting the units within a USB storage device, the structure of the present USB storage device is simpler. Moreover, when using the present USB storage device, the operation system of the host is required to execute the initialization process of the USB mass storage class driver only once, and thus the operation system of the host can recognize the USB storage device in a short time.

Furthermore, the operation system of the host controls the USB storage device as a SCSI device having two areas, and therefore can execute various processes in a simplified manner compared with the case of controlling a plurality of devices and achieve stable operation.

The USB storage device may further comprise printing means for performing printing in accordance with a command sent from the external device through the communication means. The USB storage device also may further comprise scanner means for reading a given object as image data in accordance with a command sent from the external device through the communication means.

With the USB storage device according to the invention, a USB storage device having printing function or scanner function as well as information storage function while being provided with only a single USB connector can be obtained.

Although the printing means is taken as an example of output means for performing output based on some data, and the scanner means is taken as an example of input means for performing input based on some data, output means or input means is not limited to the printing means or the scanner means. For example, output means may be display means for displaying based on display data or sound output means for outputting sound based on sound data, and input means may be operation information input means for inputting operation information about operation by a user or sound input means for inputting sound data. Furthermore, the USB storage device may have both input means and output means.

In the USB storage device having such a structure, it is preferable that the printing means or the scanner means makes a command to the control means to execute at least one of reading, writing and deleting to and from the storage means.

Then, it is possible, for example, to store a program for controlling the printing means in the second area of the storage means and make the printing means operate in accordance with the program when the printing means perform printing. It may also be possible for the external device to write printing data to the first area of the storage means and make the printing means perform printing based on the written data. It may further be possible for the scanner means to make image data read by the scanner means stored in the first area of the storage means and for the external device to read the image data stored in the first area and process the read data.

It is preferable that the storage means stores, in the second area, application software for controlling at least one of the printing means and the scanner means of the USB storage device by the external device. The application software here means a driver program, a management program and the like.

To use a printer device or a scanner device with a personal computer for the first time in a conventional manner, it is necessary to set a CD-ROM or the like in the personal computer and read a driver program to perform setting. That is, a user is required to have a medium such as a CD-ROM and always manage such a medium as well as the printer device or the scanner device, which is a troublesome task.

In contrast, with the USB storage device according to the invention within which application software, including a driver program, is previously stored, it is only necessary to read the application software and perform setting. That is, a medium such as a CD-ROM storing a driver program is no longer necessary, which will release the user from the troublesome task of media management.

In another aspect of the invention, there is provided a program to be executed by a computer embedded in the USB storage device according to the invention to make the computer function as controlling means of the USB storage device. This enables the USB storage device to operate by loading the program on the computer and starting the same when required. Since such a program may be distributed through a network, improvement in function of the USB storage device can be obtained easily.

BRIEF DESCRIPTION OF THE DRAWINGS

Preferred embodiments of the present invention will be described hereinafter with reference to the drawings, in which:

FIG. 2 is a table showing an example of data stored in a memory information storage;

DETAILED DESCRIPTION OF THE PREFERRED EMBODIMENTS

First Embodiment

Figure 1:
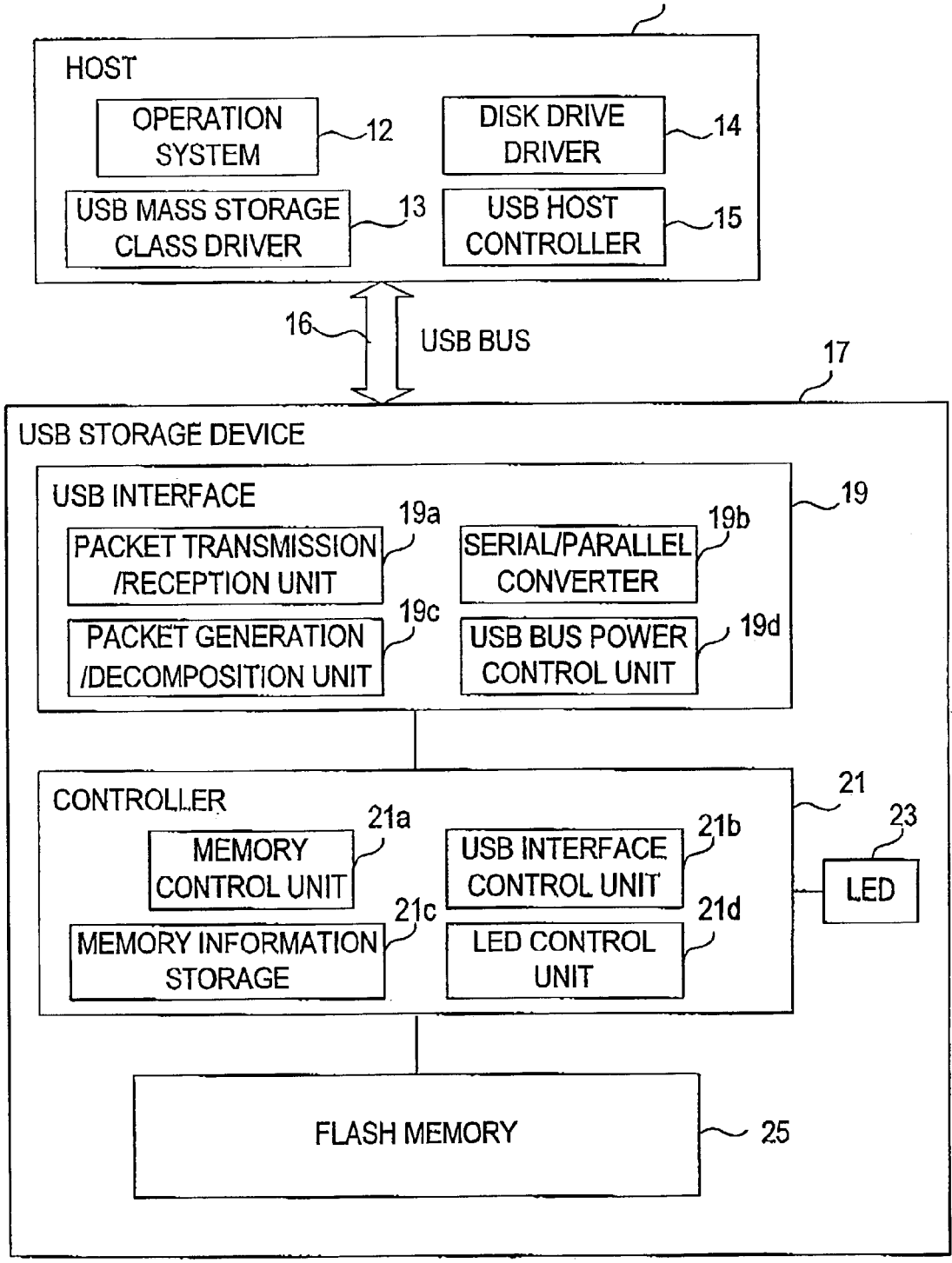
FIG. 1 is a block diagram showing the structure of a USB storage device according to a first embodiment.

FIG. 1 is a block diagram showing the schematic structure of a USB storage device 17 according to a first embodiment and a host 11.

(1) Host 11

A host 11 as an external device is a widely known personal computer, which is provided with at least an operation system 12, a disk drive driver 13 and a USB mass storage class driver 14 as software, and a USB host controller 15 as hardware.

The operation system 12 is software that comprehensively controls the host 11, such as Windows™ and Mac OS X™. The disk drive driver 13 performs SCSI command conversion of an access command and the like to a storage device received from the operation system 12 and sends the converted command to the USB mass storage class driver 14, as well as receives a command and the like from the USB mass storage class driver 14 and sends the same to the operation system 12. The USB mass storage class driver 14 controls the USB host controller 15. The USB host controller 15 is provided with a not shown USB connector and is connected to the USB connector of another device through a cable to enable communication according to the USB standard. The host 11 may be a PDA or a cellphone other than a personal computer, as long as it can perform communication according to the USB standard.

(2) USB Storage Device 17

The USB storage device 17 is provided with a USB interface 19, a controller 21, an LED 23 and a flash memory 25.

(2-1) USB Interface 19

The USB interface 19 corresponding to communication means performs the function of communicating with the host 11 through a USB bus 16. The USB interface 19 is provided with a packet transmission/reception unit 19a, a serial/parallel converter 19b, a packet generation/decomposition unit 19c and a USB bus power control unit 19d. The packet transmission/reception unit 19a is connected to a not shown USB connecter and transmits/receives packets according to the USB standard. The serial/parallel converter 19b converts serial data to/from parallel data. The packet generation/decomposition unit 19c generates packets to communicate with the host 11 and decomposes packets to retrieve data. The USB bus power control unit 19d controls the electrical power supplied by the host and distributes the electrical power to the respective regions of the USB storage device 17.

(2—2) Controller 21

The controller 21 corresponding to control means is provided with a memory control unit 21a, a USB interface control unit 21b, a memory information storage 21c and an LED control unit 21d. The memory control unit 21a performs reading, writing and deleting data to and from a flash memory 25. The USB interface control unit 21b controls the respective regions of the USB interface 19 mentioned above. The controller 21 includes a program storage (not shown) containing a program for operating the memory control unit 21a, the USB interface control unit 21b and the LED control unit 21d. The memory information storage 21c stores information about areas of the flash memory 25. The information corresponds to after-mentioned "information to make the USB mass storage class driver recognize first and second areas as areas corresponding to logical unit numbers defined in the SCSI command set of the USB mass storage class driver". The information will be explained below with reference to the example of data in FIG. 2.

As shown in FIG. 2, the memory information storage 21c includes areas for logical unit numbers 31, formats 33, writing/deleting allowed/not allowed flags 35, logical block numbers 37 and physical block numbers 39. The logical unit numbers 31, which are numbers for identifying logical units, include "0" and "1." The formats 33 correspond to the logical unit numbers 31 and indicate the formats of respective logical units. In the present example of data, logical unit number "0" indicates "FAT" format, while logical unit number "1" indicates "ISO9660" format. The writing/deleting allowed/not allowed flag 35 indicates, correspondingly to the logical unit number 31, whether or not writing/deleting information to the logical unit is allowed. In the present example of data, it is "allowed" with respect to logical unit number "0" and is "not allowed" with respect to logical unit number "1." The logical block numbers 37, which are block numbers assigned by the host 11, are defined within each logical unit.

The correspondence between the physical block numbers 39 which are actual block numbers of the flash memory 25 and the logical block numbers 37 is controlled by the memory control unit 21a. Accordingly, the correspondence between the physical block numbers 39 and the logical block numbers 37 is freely variable. Also, it may be possible to employ ISO9660 as the format for logical unit number "0" and FAT for logical unit number "1." Moreover, the number of logical units may be further increased to allow for selectable use of the logical unit in accordance with users Or applications.

(2-3) LED 23

Returning to FIG. 1, the LED 23 is a light emitter that lights up while reading, writing or deleting is executed to/from the flash memory 25. This is to notify the user that reading, writing or deleting is being executed to/from the flash memory 25, thereby to prevent the USB storage device 17 from being pulled out of the host 11 during the execution of these operations.

(2-4) Flash Memory 25

The flash memory 25 is a semiconductor memory that stores data without requiring memory holding operation. The stored data can be read out by the memory control unit 21a. Writing and deleting is also possible by the memory control unit 21a. The flash memory 25 corresponds to storage means.

(a) Boot Process

Figure 3:
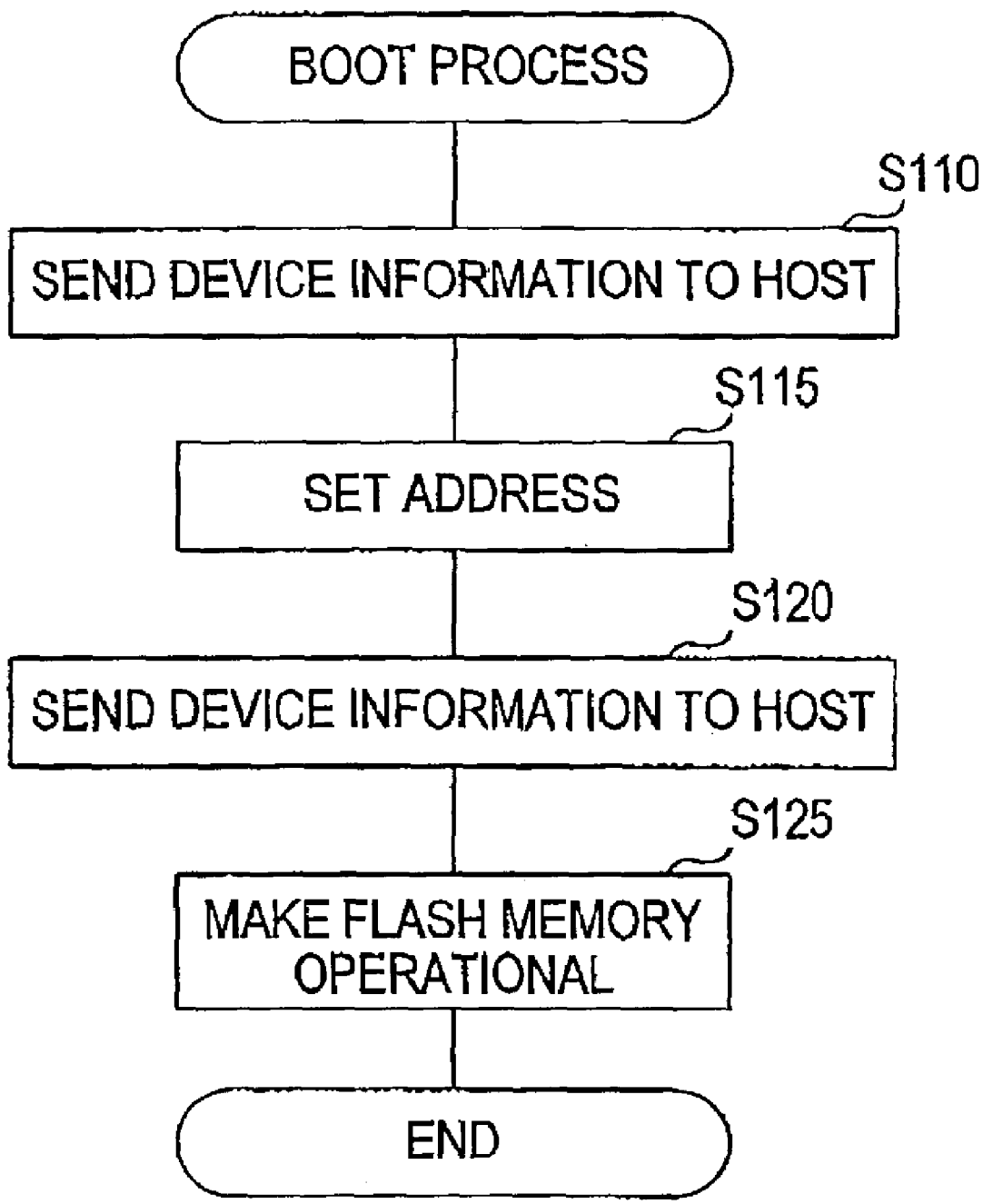
FIG. 3 is a flowchart for illustrating the boot process.

The boot process executed by the controller 21 of the USB storage device 17 according to a program when the USB storage device 17 is connected to the host 11 will be described with reference to the flowchart in FIG. 3. The boot process is started when the USB storage device 17 is connected to the host 11, and thereby electrical power is supplied to the USB bus power control unit 19d, then enumeration process is done in the host 11.

Once the boot process is started, device information (e.g. the maximum packet size of the default pipe) called a descriptor is sent to the host 11 in accordance with the command from the host 11 (S110).

Then, the address of the USB storage device 17 is set according to the command from the host 11. (S115). Thereafter, the USB storage device 17 obtains only frames addressed to the set address.

Subsequently, further detailed device information is sent to the host 11 (S120). The device information includes, for example, information about endpoints, the class, the subclass and the protocol.

Then, in the host 11, a USB mass storage class driver 14 is started, and an access path for the control of the USB host controller 15 from not shown application software through the disk drive driver 13 and the USB mass storage class driver 14 is established. The disk drive driver 13 is a driver which lasts from the MS-DOS™ era and is based on the long-time accumulated technology, so that it can provide a stable operation.

Subsequently, when the USB mass storage class driver 14 requests the number of logical unit numbers by a Get Max Logical Unit Number command, the USB storage device 17 reads out the information that the number of logical unit numbers is "2" from the memory information storage 21c, and sends the information to the host 11.

When the disk drive driver 13 issues an Inquiry command, the USB storage device 17 reads out the information about the formats of the respective logical units from the memory information storage 21c, and sends the information to the host 11.

As a result, the host 11 recognizes the USB storage device 17 as a device with an area assigned logical unit number "0" and in FAT format and an area assigned logical unit number "1" and in ISO9660 format.

Once the communication between the USB storage device 17 and the host 11 is established, the flash memory 25 is made operational (S125), and the boot process is terminated.

Windows™ has the function of executing the application software specified in a file named "autorun.inf" stored in the root directory of a storage medium when the storage medium is inserted or connected. Accordingly, in the case where the file is stored in the area of the flash memory 25 assigned logical unit number "1," the specified software can be automatically executed when the USB storage device 17 is attached to the host 11.

As described above, even if the user is not used to operating the host 11, the specified application software is automatically executed by simply attaching the USB storage device 17 to the host 11. Therefore, when the USB storage devices 17 are widely distributed to the public as sales promotion items, for example, the application software serving for sales promotion will be securely executed, which will increase the sales promotion effect.

(b) Access Process

Figure 4:
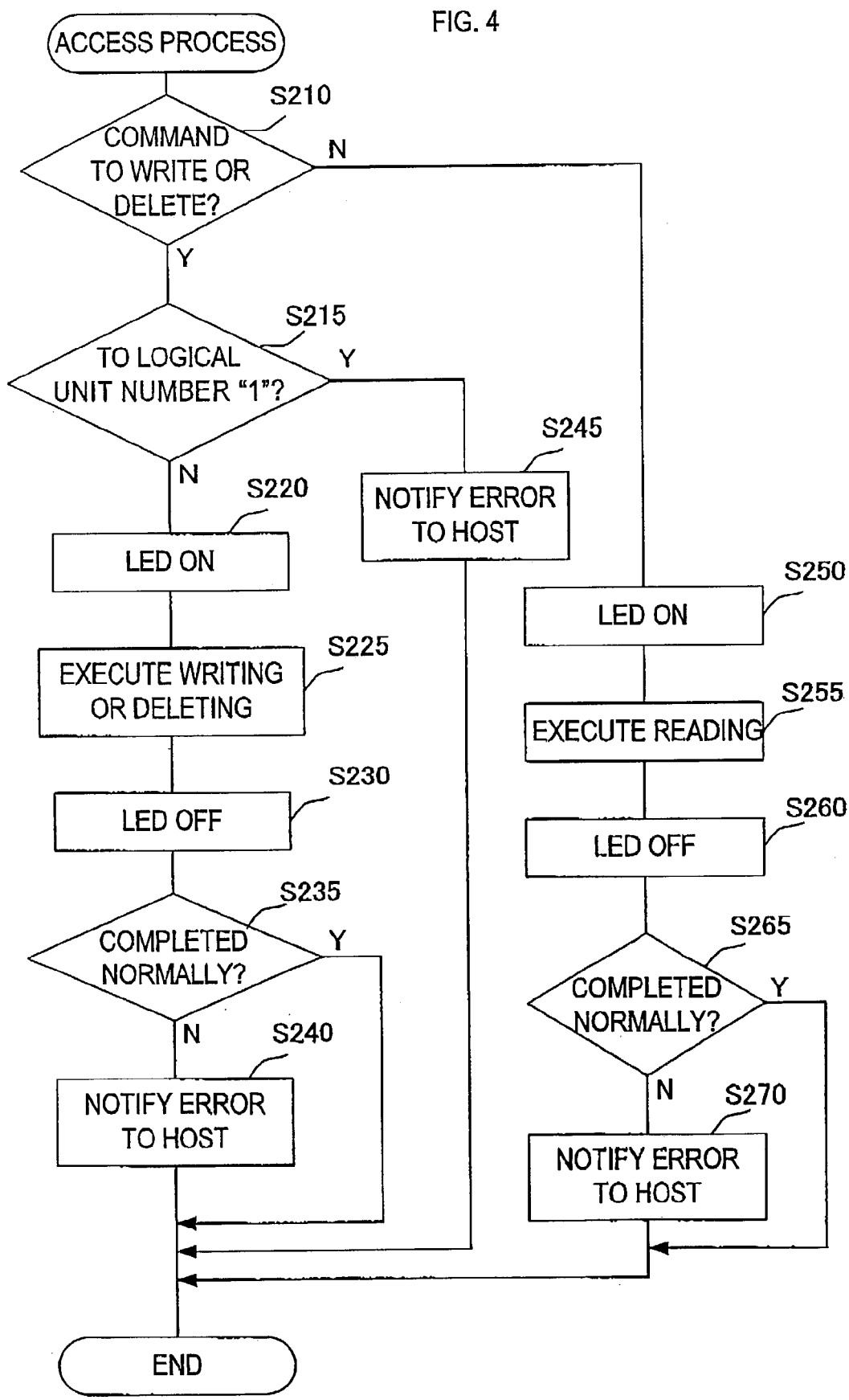
FIG. 4 is a flowchart for illustrating the access process.

The access process executed by the controller 21 of the USB storage device 17 according to a program when various types of software operating in the host 11 sends a command to execute writing, reading or deleting of data to the USB storage device 17 will now be described with reference to the flowchart of FIG. 4.

First, in S210, the access process is branched depending on the kind of command received from the host 11. Specifically, when it is a command to write or delete, the process proceeds to S215, and otherwise, i.e. when it is a command to read, the process proceeds to S250.

In S 215, the access process is branched depending on whether or not the command to write or delete is a command to logical unit number "1." That is, the access process is branched depending on whether or not the command is to the logical unit to/from which writing or deleting is impossible. When it is to logical unit number "1," the process proceeds to S245, while when it is to logical unit number "0," the process proceeds to S220.

In S220, the LED 23 is turned on.

In S225, data is written to a block of the flash memory 25 specified by the host 11. Or data is deleted from a block of the flash memory 25 specified by the host 11. Writing or deleting of data is executed to/from the block of the flash memory 25 specified by the physical block number 39 corresponding to the logical block number 37 when the block number 37 is specified by the host 11, by using the information about the areas of the flash memory 25 (see FIG. 2) stored in the memory information storage 21c.

In S230, the LED 23 is turned off.

In S235, the access process is branched depending on whether or not the process in S225 has been completed normally. When the process in S225 has been completed normally, the access process is terminated, while when not completed, the access process proceeds to S240.

In S240, the fact that the process in S225 has not been completed normally is notified to the host 11 and the access process is terminated.

On the other hand, in S245 to which the access process proceeds when it is determined that a command to write or delete is a command to logical unit number "1", occurrence of an error, i.e. the fact that an unacceptable command has been received, is notified to the host 11.

In S250 to which the access proceeds when it is determined that a command to read has been received, the LED 23 is turned on.

In S255, the data in the block of the flash memory 25 specified by the host 11 is read, and the read data is sent to the host 11. Reading of data is executed from the block of the flash memory 25 specified by the physical block number 39 corresponding to the logical block number 37 when the block number 37 is specified by the host 11, by using the information about the areas of the flash memory 25 (see FIG. 2) stored in the memory information storage 21c.

In S260, the LED 23 is turned off.

Then in S265, the access process is branched depending on whether or not the process in S255 has been completed normally. When the process in S255 has been completed normally, the access process is terminated, while when not completed, the access process proceeds to S270.

In S270, the fact that the process in S255 has not been completed normally is notified to the host 11, and the access process is terminated.

Since the access process is executed as described above, when the USB storage device 17 is used as a sales promotion item, for example, deletion of software which should not be deleted by mistake can be prevented by storing the software in the area with logical unit number "1."

The USB storage device 17 has, in the memory information storage 21c, the information to make the USB mass storage class driver 14 recognize the area with logical unit number "0" and the area with logical unit number "1" as areas corresponding to the logical unit numbers specified in the SCSI command set of the USB mass storage class driver 14. Accordingly, the USB mass storage class driver 14 recognizes the USB storage device 17 as a SCSI device having two logical units.

In this case, the controller 21 can be simplified compared with the case where area management is performed by increasing the number of endpoints according to the USB standard, which requires the controller 21 to have the same number of FIFO buffers as the number of the endpoints. Also compared with the case where area management is performed by providing two kinds of USB storage device units and a hub connecting the units within a USB storage device, the structure of the USB storage device 17 is simpler. When using the present USB storage device 17, the host 11 is required to execute the initialization process of the USB mass storage class driver 14 only once, and thus the host 11 can recognize the USB storage device 17 in a short time. Furthermore, the operation system in the host 11 controls the USB storage device 17 as a SCSI device having two areas, and therefore can execute various processes in a simplified manner compared with the case of controlling a plurality of devices, and can achieve stable operation.

(c) Initialization Process

Initialization Process is executed by the controller 21 of the USB storage device 17 according to, a program when a manufacturer, a distributor or the like (hereinafter referred to as the "specific user") executes initialization software on the host 11 and presses an after-mentioned write button 66 in order to perform initialization.

Figure 5:
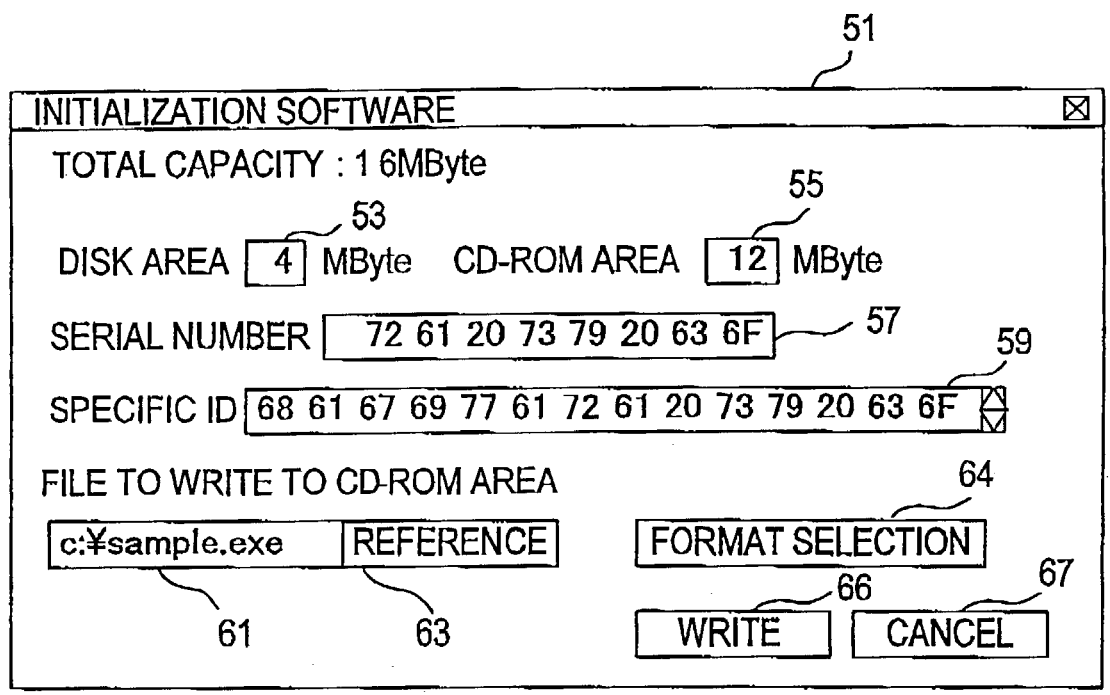
FIG. 5 is an example of screen for illustrating an operation screen for initialization software.

Before explaining the initialization process, initialization software to be executed on the host 11 will be described with reference to an operation screen 51 in FIG. 5. On the operation screen 51, the specific user may perform setting of a variety of parameters with respect to the USB storage device 17.

A text box 53 is a text box for inputting the capacity of an area (disk area) which corresponds to logical unit number "0" and allows reading, writing and deleting of information. A text box 55 is a text box for inputting the capacity of an area (CD-ROM area) which corresponds to logical unit number "1" and allows only reading of information. The specific user must input respective values to the text box 53 and the text box 55 such that the total of the values is less or equal to 16, i.e. the total capacity.

A text box 57 is a text box for inputting a serial number defined according to the USB standard. The host 11 can identify a device by the serial number.

A text box 59 is a text box for inputting a specific ID. The specific ID is not defined according to the USB standard, but is specific to the USB storage device 17 of the present embodiment. The specific ID may be used as a license key to prevent unauthorized starting of a content by using an unauthorized copy or the like, and may be used for an authentication key or for member services as well. The specific ID is hexadecimal data of 16 bytes or more and 612 bytes or less. The operation screen 51 is designed such that when up and down buttons at the right end of the text box 59 are pressed, data unable to be indicated at one time is sequentially indicated in the text box 59.

A text box 61 is a text box for inputting the file name of a file to be written to the CD-ROM area. The text box 61 may be designed so as to input the file names of a plurality of files therein.

A reference button 63 is a button for displaying a dialog box to support input of a file name in the text box 61. When the specific user selects a file name from the displayed dialog box, the selected file name is indicated in the text box 61.

A format selection button 64 is a button for displaying a dialog box for selecting a format of CD image data. Either ISO9660 format or HFS format may be selected from the displayed dialog box.

A write button 66 is a button for starting the process of writing the setting information set by the specific user on the operation screen 51 to the USB storage device 17.

A cancel button 67 is a button for closing the operation screen 51 without writing the setting information set by the specific user on the operation screen 51 to the USB storage device 17.

Figure 6:
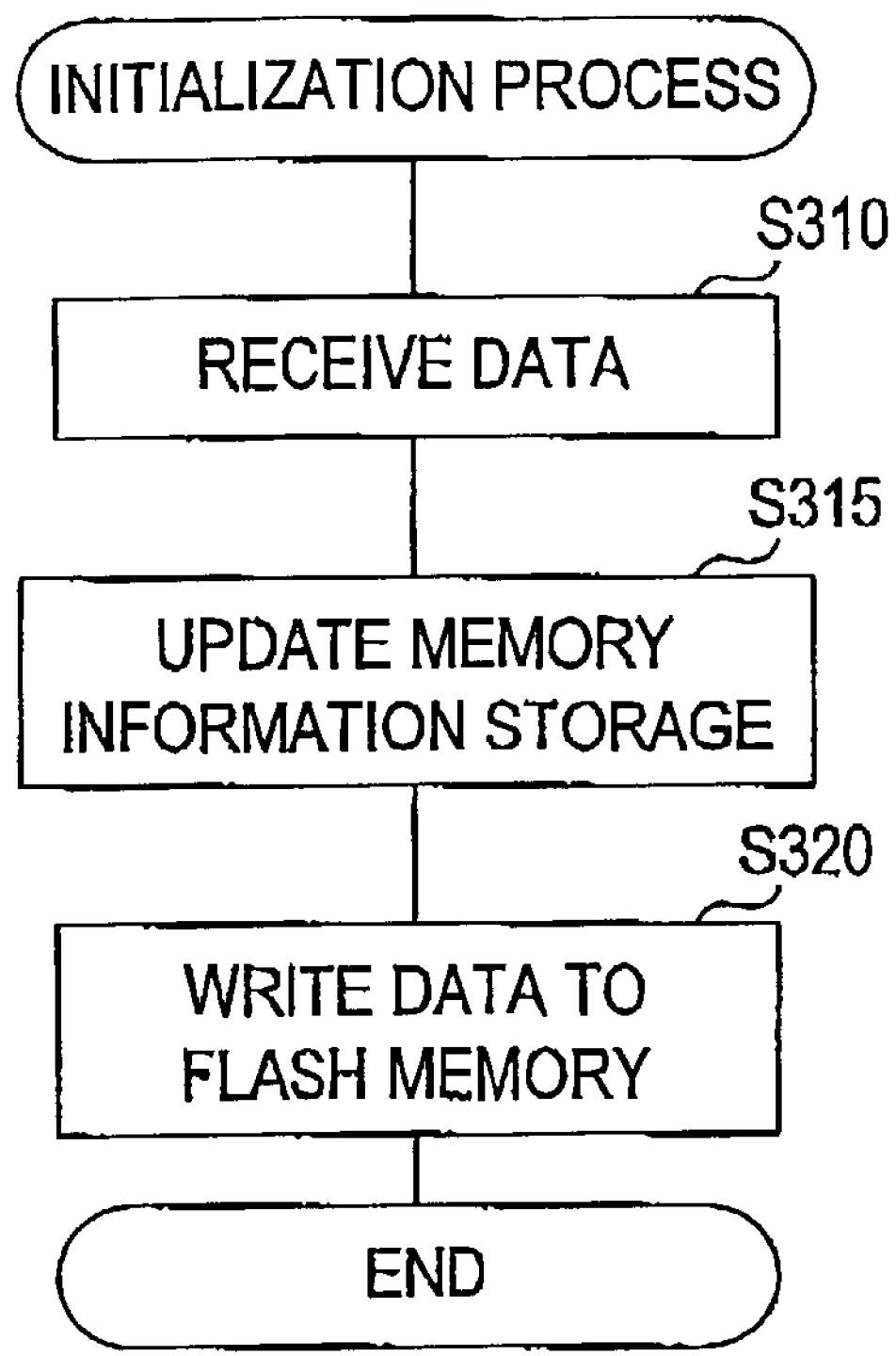
FIG. 6 is a flowchart for illustrating the initialization process.

The initialization process executed by the controller 21 of the USB storage device 17 will next be described with reference to the flowchart of FIG. 6. When execution is started, the setting information which is set on the operation screen 51 as above and sent from the host 11 is first received (S310). Then, data in the memory information storage 21c is updated based on the received setting information (S315).

Subsequently, the data is written to the area with logical unit number "1" of the flash memory 25 based on the received setting information (S320), and the initialization process is terminated. Although writing to the area with logical unit number "1" is not allowed originally, writing only in the initialization process is allowed. The data to be written is the file specified in the text box 61 (see FIG. 5).

According to the initialization process as described above, it is possible to change the capacity of areas, set a serial number, set a specific ID and previously store a file in the CR-ROM area in accordance with the conditions of the specific user.

Second Embodiment

Figure 7:
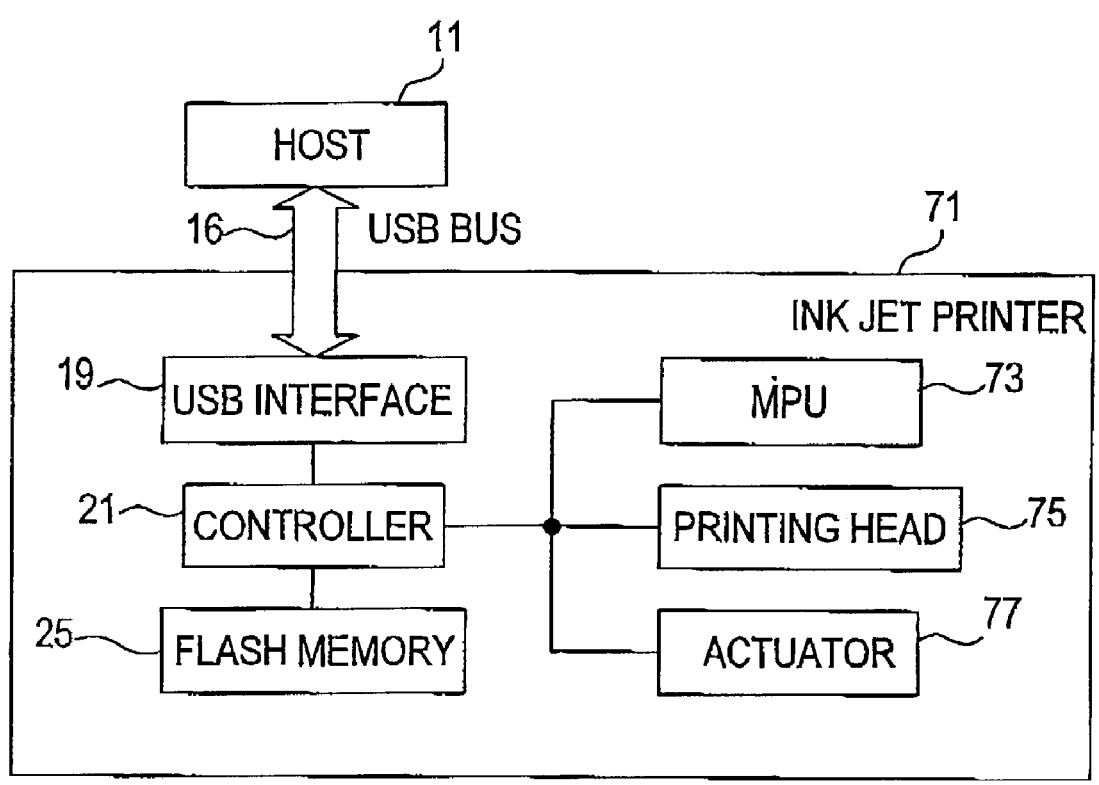
FIG. 7 is a block diagram showing the structure of an ink jet printer according to a second embodiment.

FIG. 7 is a block diagram showing the schematic structure of an ink jet printer 71 according to a second embodiment and a host 11. The ink jet printer 71 corresponds to a USB storage device and the host 11 corresponds to an external device. The same portions or units as in the first embodiment are assigned the same reference numbers to avoid a repeated explanation.

The ink jet printer 71 is provided with a USB interface 19, a controller 21, a flash memory 25, an MPU 73, a printing head 75 and an actuator 77. The USB interface 19 corresponds to communication means, the controller 21 corresponds to control means, and the flash memory 25 corresponds to storage means. The MPU 73, the printing head 75 and the actuator 77 correspond to printing means.

The MPU 73 communicates with the host 11 through the USB interface 19 and the controller 21, and controls the operation of the printing head 75 and the actuator 77 based on the information from not shown various sensors. While the controller 21 and the MPU 73 are separately configured in the second embodiment, all or part of the functions of the controller 21 may be shifted to the MPU 73.

The printing head 75 having an ink nozzle ejects ink of a given color through the ink nozzle to fix the ink on a sheet of printing paper.

The actuator 77 comprising a feed roller motor, a paper transfer roller motor and a printing head driving motor, none of which is shown, adjusts the positional relationship between the printing paper and the printing head 75 by making these motors operate appropriately so as to obtain a desired printing result.

Since application software for the host 11 to handle the data to be printed is previously contained in the area with logical unit number "1" of the flash memory 25 (the CD-ROM area), the host 11 can use the application software without containing the same in itself by reading out from the CD-ROM area of the flash memory 25.

Conventionally, in contrast, a driver program for providing printing function, printing management software or the like is required to be installed from a medium such as a CD-ROM Or a flexible disk, or be downloaded through the Internet and installed, if not contained in the host 11. However, it is difficult to install such a program or software from the medium into, for example, a PDA which usually does not have a drive for CD-ROMs or flexible disks. In view of the above, the ink jet printer 71 of the second embodiment provides advantages over conventional devices.

Also, since the application software is contained in the CD-ROM area of the flash memory 25, it will not be deleted by an end user by mistake. To contain printing data for execution of printing in the disk area (the area with logical unit number "0") enables a plurality of hosts 11 to share the printing data through the disk area. In this respect, the ink jet printer 71 of the second embodiment provides further advantages over conventional devices.

Further, when the specific ID described in the first embodiment is set and used as an authentication key, it may be possible for only a specific user to use the ink jet printer 71 or for only a specific user to use the application software contained in the CD-ROM area.

Third Embodiment

Figure 8:
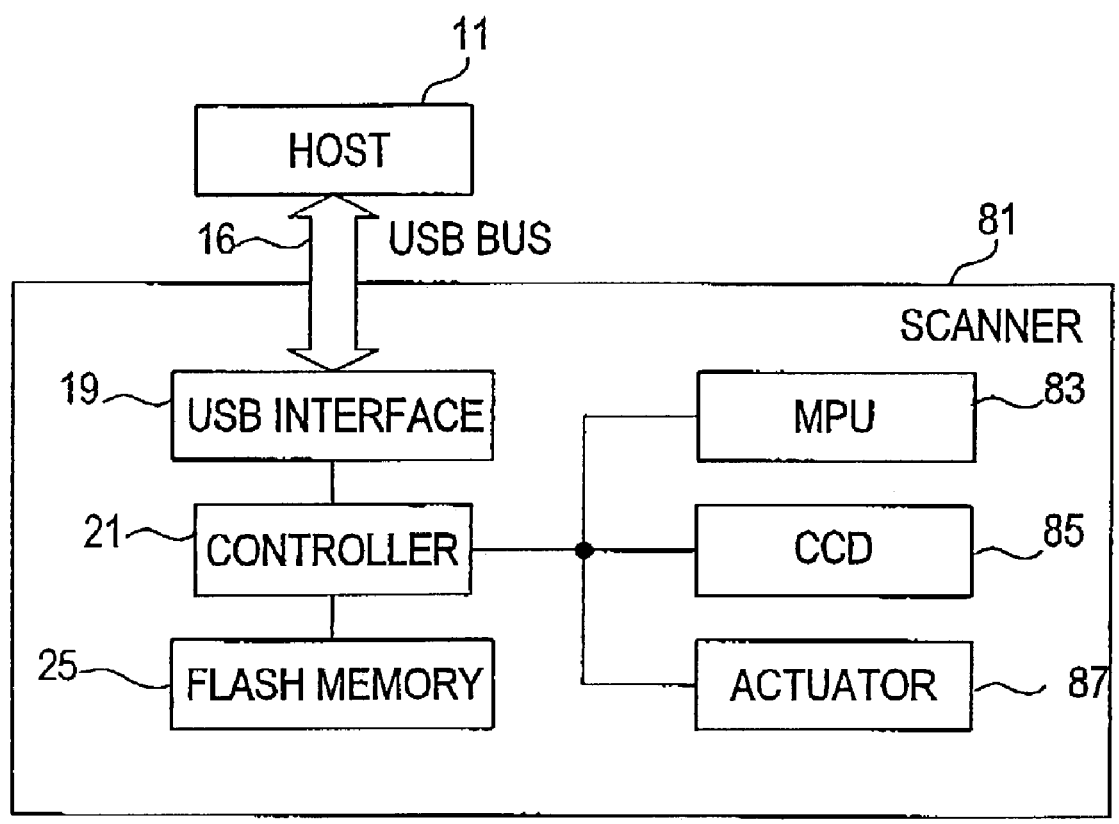
FIG. 8 is a block diagram showing the structure of a scanner according to a third embodiment.

FIG. 8 is a block diagram showing the schematic structure of a scanner 81 according to a third embodiment and a host 11. The scanner 81 corresponds to a USB storage device and the host 11 corresponds to an external device. The same portions or units as in the first embodiment are assigned the same reference numbers to avoid a repeated explanation.

The scanner 81 is provided with a USB interface 19, a controller 21, a flash memory 25, an MPU 83, a CCD 85 and an actuator 87. The USB interface 19 corresponds to communication means, the controller 21 corresponds to control means, and the flash memory 25 corresponds to storage means. The MPU 83, the CCD 85 and the actuator 87 correspond to scanner means.

The MPU 83 communicates with the host 11 through the USB interface 19 and the controller 21, and controls the operation of the CCD 85 and the actuator 87. While the controller 21 and the MPU 83 are separately configured in the third embodiment, all or part of their functions may be performed by the MPU 83.

The CCD 85 which is a semiconductor element for converting optical information to electrical signals reads out a given object as image data and outputs the image data.

The actuator 87 comprising an optical source driving motor and a CCD driving motor, none of which is shown, obtains the image data in a desired area of the given object by making these motors operate appropriately.

Since application software for the host 11 to handle the data to be scanned is previously contained in the area with logical unit number "1" of the flash memory 25 (the CD-ROM area), the host 11 can use the application software without containing the same in itself by reading out from the CD-ROM area of the flash memory 25.

Conventionally, in contrast, a driver program for providing the function of controlling the scanner 81, image data processing software or the like is required to be installed from a medium such as a CD-ROM or a flexible disk, or be downloaded through the Internet and installed, if not contained in the host 11. However, it is difficult to install such a program or software from the medium into, for example, a PDA which usually does not have a drive for CD-ROMs or flexible disks. In view of the above, the scanner 81 of the third embodiment provides further advantages over conventional devices.

Also, since the application software is contained in the CD-ROM area of the flash memory 25, it will not be deleted by an end user by mistake. Furthermore, to contain image data in the disk area (the area with logical unit number "0") enables a plurality of hosts 11 to share the image data through the disk area. In this respect, the scanner 81 of the third embodiment provides advantages over conventional devices.

In addition to the three embodiments as described above, other embodiments are described below.

The technological idea of the ink jet printer 71 in the second embodiment or the scanner 81 in the third embodiment may be applied to other devices having a USB interface, such as a digital camera, a portable terminal, a speaker, a keyboard, a mouse, a modem, a hand set, and a card adapter. In this case, the same advantages as in the above embodiments can be obtained.

While the operation screen 51 in the first embodiment (see FIG. 5) is designed to select the format of CD image data from ISO9660 format and HFS format, the operation screen 51 may be designed such that the format can be selected also from additional formats of Audio CD, CD TEXT, Mixed CD, Enhanced CD, Video CD, Bootable CD. The storage method may be specified from among various methods, such as Disk-at-Once, Track-at-Once, Session-at-Once, and Packet Writing.

What is claimed is:

1. A USB storage device capable of being attached to and detached from an external device controlled by a given operation system and provided at least with a disk drive driver, a USB mass storage class driver, and a USB host controller, wherein the USB storage device comprising:
a flash memory having a first area configured with a disk format and a second area configured with a CD-ROM format;
a USB interface that performs communication with the external device according to a USB protocol; and
a controller that executes reading, writing and deleting of information to and from the storage through the USB interface;
the controller includes a memory information storage that stores format type information of the first area and the second area respectively corresponding to logical unit number in order to make the USB mass storage class driver recognize the first area as a disk unit to and from which reading, writing and deleting of information can be executed and the second area as a CD-ROM unit for which only reading of information can be executed;
the controller sends the format type information of the first area and the second area to the USB mass storage class driver in response to a command from the disk drive driver so that the USB mass storage class driver recognizes the USB storage device as a SCSI device having two logical units including the disk unit and the CD-ROM unit and the operation system recognizes the format type information of the first area and the second area and limits issuance of either of a command to write to and a command to delete from the second area; and
the controller, in accordance with a command received from the external device and the format type information of the first area and the second area, executes reading, writing and deleting of information to and from the first area and executes only reading of information from the second area even though the controller receives either of a command to write to and a command to delete from the second area; and
an application program, previously stored in the second area, is automatically executed when the USB storage device is attached to the external device on a condition that the application program is so designated in a root directory.

2. A USB storage device capable of being attached to and detached from an external device controlled by a given operation system and provided at least with a disk drive driver, a USB mass storage class driver, and a USB host controller, wherein the USB storage device comprising:
a flash memory having a first area configured with a disk format and a second area configured with a CD-ROM format;
a USB interface that performs communication with the external device according to a USB protocol; and
a controller that executes reading, writing and deleting of information to and from the storage through the USB interface, wherein the controller comprises;
memory information storage that stores format type information of the first area and the second area in order to make the USB mass storage class driver recognize the first area as a disc device to and from which reading, writing and deleting of information can be executed and the second area as a CD-ROM device for which only reading of information can be executed;
format type information sending means that sends the format type information of the first area and the second area to the USB mass storage class driver in response to a command from the disk drive driver such that the USB mass storage class driver recognizes the USB storage device as two kind of devices including the disk device and the CD-ROM device and the operation system recognizes the respective format of the first area and the second area and limits issuance of either of a command to write to and a command to delete from the second area; and
access executing means that executes, in accordance with a command received from the external device and the format type information of the first area and the second area, reading, writing and deleting of information to and from the first area and executes only reading of information from the second area even though the controller receives a command to write to or delete from the second area; and an application program, stored in the second area, is automatically executed when the USB storage device is attached to the external device on a condition that the application program is so designated in a root directory.

3. A USB storage device capable of being attached to and detached from an external device controlled by a given operation system and provided at least with a disk drive driver, a USB mass storage class driver, and a USB host controller, wherein the USB storage device comprising:

a flash memory having a first area configured with a first type format in which reading, writing and deleting of information can be executed and a second area configured with a second type format in which only reading of information can be executed;

a USB interface that performs communication with the external device according to a USB protocol; and a controller that executes reading, writing and deleting of information to and from the storage through the communication device, wherein the control device comprises;

memory information storage that stores format type information of the first area and the second area in order to make the USB mass storage class driver recognize the first area as a device to and from which reading, writing and deleting of information can be executed and the second area as a device for which only reading of information can be executed;

format type information sending means that sends the format type information of the first area and the second area to the USB mass storage class driver in response to a command from the disk drive driver such that the USB mass storage class driver recognizes the first area as a device to and from which reading, writing and deleting of information can be executed and the second area as a device for which only reading of information can be executed and the operation system recognizes respective format of the first area and the second area and limits issuance of either of a command to write to and a command to delete from the second area; and access executing means that executes, in accordance with a command received from the external device and the format type information of the first area and the second area, reading, writing and deleting of information to and from the first area and executes only reading of information from the second area even though the controller receives a command to write to or delete from the second area; and an application program, stored in the second area, is automatically executed when the USB storage device is attached to the external device on a condition that the application program is so designated in a root directory.

4. A method of interaction between a USB storage device and an external device comprises the steps of:

locating a controller completely in the USB storage device, the controller sends format type information of a first area and a second area of the USB storage device to a USB mass storage class driver in response to an INQUIRY command from a disk drive driver so that the USB mass storage class driver recognizes the USB storage device as a SCSI device having two logical units including a disk unit and a CD-ROM unit and an operation system recognizes respective format of the first area and the second area and limits issuance of either of a command to write to and a command to delete from the second area, and the control device;

executing, in accordance with a command received from the external device and the format type information of the first area and the second area, reading, writing and deleting of information to and from the first area and executes only reading of information from the second area even though the controller receives either of a command to write to and a command to delete from the second area; and the controller automatically executing an application program, stored in the second area when the USB storage device is attached to the external device on a condition that the application program is so designated in a root directory.

5. A method of interaction between a USB storage device and an external device comprises the steps of:

locating a controller completely in the USB storage device and the controller sends format type information of a first area and a second area of the USB storage device to a USB mass storage class driver in response to an INQUIRY command from the disk drive driver so that the USB mass storage class driver recognizes the USB storage device as two kind of devices including a disk device and a CD-ROM device and an operation system recognizes respective format of the first area and the second area and limits issuance of either of a command to write to and a command to delete from the second area, and the controller;

executing, in accordance with a command received from the external device and the format type information of the first area and the second area, reading, writing and deleting of information to and from the first area and executes only reading of information from the second area even though the controller receives either of a command to write to and a command to delete from the second area; and the controller automatically executing an application program, stored in the second area, when the USB storage device is attached to the external device on a condition that the application program is so designated in a root directory.

6. A method of interaction between a USB storage device and an external device comprises the steps of:

locating a controller completely in the USB storage device, the controller sends format type information of a first area and a second area of the USB storage device to a USB mass storage class driver in response to an INQUIRY command from a disk drive driver so that the USB mass storage class driver recognizes the first area as a device to and from which reading, writing and deleting of information can be executed and the second area as a device for which only reading of information can be executed and an operation system recognizes respective format of the first area and the second area and limits issuance of either of a command to write to and a command to delete from the second area, and the controller;

executing, in accordance with a command received from the external device and the format type information of the first area and the second area, reading, writing and deleting of information to and from the first area and executes only reading of information from the second area even though the controller receives either of a command to write to and a command to delete from the second area; and the controller automatically executing an application programs, stored in the second area, when the USB storage device is attached to the external device on a condition that the application program is so designated in a root directory.

* * * * *